US012252887B2

(12) United States Patent
Sanchis Brines et al.

(10) Patent No.: US 12,252,887 B2
(45) Date of Patent: Mar. 18, 2025

(54) METHOD FOR MANUFACTURING A CUTTABLE CLADDING PANEL WITH A MATCHING PATTERN

(71) Applicant: COMPACSTONE USA, INC., Miami, FL (US)

(72) Inventors: Francisco Sanchis Brines, Valencia (ES); Arturo Del Saz Salazar, La Pobla de Vallbona (ES)

( * ) Notice: Subject to any disclaimer, the term of this patent is extended or adjusted under 35 U.S.C. 154(b) by 0 days.

(21) Appl. No.: 18/434,406

(22) Filed: Feb. 6, 2024

(65) Prior Publication Data

US 2024/0309647 A1 Sep. 19, 2024

Related U.S. Application Data

(62) Division of application No. 17/072,193, filed on Oct. 16, 2020, now Pat. No. 11,891,813.

(30) Foreign Application Priority Data

Oct. 24, 2019 (EP) .................................... 19382924

(51) Int. Cl.
*B44C 3/12* (2006.01)
*B28B 1/14* (2006.01)
(Continued)

(52) U.S. Cl.
CPC ............ *E04F 13/0873* (2013.01); *B28B 1/14* (2013.01); *B28B 11/10* (2013.01);
(Continued)

(58) Field of Classification Search
CPC ... E04F 13/0871; E04F 13/0873; E04F 13/14; E04F 13/142; E04F 13/144;
(Continued)

(56) References Cited

U.S. PATENT DOCUMENTS 1,453,728 A * 5/1923 Fernand .................... B44F 3/00 434/96
1,479,647 A * 1/1924 Carroll .................... E04F 13/14 52/564
(Continued)

*Primary Examiner* — Kyle J. Walraed-Sullivan
(74) *Attorney, Agent, or Firm* — Eugenio J. Torres-Oyola; Victor M. Rodriguez-Reyes; Rafael Rodriguez-Muriel

(57) ABSTRACT

The present invention relates to a cuttable cladding panel with a matching pattern, the use, and the design method thereof. The cladding panel comprises an irregular pattern (10) of elongated lines, veins, and/or strips; transverse cutting lines (20) all of them cutting through the pattern at identical transverse intersecting points symmetrical with respect to a longitudinal axis of symmetry (SL); pairs of longitudinal cutting lines (30) symmetrical with respect to the longitudinal axis of symmetry (SL), each pair of longitudinal cutting lines cutting through the pattern at identical longitudinal intersecting points; with said cutting lines crossing one another at corner points (P); wherein each transverse intersecting point (21) is at the same distance from a corner point (P) as a corresponding longitudinal intersecting point (31); with two parts obtained by cutting the cladding panel (1) along any cutting line having a matching and continuous irregular pattern (10).

11 Claims, 8 Drawing Sheets

(51) Int. Cl.
*B28B 11/10* (2006.01)
*E04F 13/08* (2006.01)
*E04F 13/14* (2006.01)
*B44F 9/04* (2006.01)

(52) U.S. Cl.
CPC ........ *E04F 13/0866* (2013.01); *E04F 13/142* (2013.01); *B44C 3/12* (2013.01); *B44F 9/04* (2013.01)

(58) Field of Classification Search
CPC ..... E04F 13/147; E04F 13/165; E04F 13/105; E04F 13/123; E04F 13/185; B44C 1/28; B44C 3/12; B44C 3/123; B44F 3/00; B44F 9/00; B44F 9/04; B44F 1/06
See application file for complete search history.

(56) References Cited

U.S. PATENT DOCUMENTS 1,871,887 A * 8/1932 Jasinski ................ E04F 13/147 264/DIG. 57
1,872,352 A * 8/1932 Schlosser .................. B44F 9/04 264/158
1,973,564 A * 9/1934 Graham .................... A63F 9/06 434/96
2,040,863 A * 5/1936 MacDonald .............. B44F 9/04 428/196
2,569,543 A * 10/1951 Stolp, Jr. ................. B44C 3/085 428/207
3,174,893 A * 3/1965 Church ................... B44F 11/06 52/309.3
3,895,136 A * 7/1975 Makishima ............... B44F 9/00 427/257
4,239,820 A * 12/1980 Salvador ................... B44F 9/04 427/272
4,325,177 A * 4/1982 DePoorter ............... B44C 3/123 428/167
5,011,411 A * 4/1991 Loewy .................... B44C 3/123 434/96
5,145,537 A * 9/1992 Senzani .................. B32B 21/13 144/350
5,755,068 A * 5/1998 Ormiston .......... E04F 15/02033 428/167
5,945,181 A * 8/1999 Fisher ..................... E04F 15/08 428/33
6,237,294 B1 * 5/2001 Rygiel .................... B29C 70/30 264/220
6,455,113 B1 * 9/2002 Bilodeau ................... B44F 9/00 362/153.1
7,815,190 B1 * 10/2010 Krisch ...................... A63F 9/10 273/157 R
10,066,393 B1 * 9/2018 Menendez ................ E04C 2/06
2004/0211145 A1 * 10/2004 Montolio ................ E04F 15/08 52/311.1
2004/0221948 A1 * 11/2004 Tugonon ................. E04F 15/02 156/256
2005/0064128 A1 * 3/2005 Lane ....................... E04C 2/296 428/44
2005/0210811 A1 * 9/2005 Nasvik .................. E04F 13/147 52/596
2006/0003132 A1 * 1/2006 Correia ............... E04F 13/0885 428/44
2006/0156668 A1 * 7/2006 Nasvik .................... B32B 13/02 52/516
2006/0204682 A1 * 9/2006 Yang ......................... B44F 9/04 428/15
2007/0077387 A1 * 4/2007 Riccobene ................ B44F 3/00 428/44
2007/0178286 A1 * 8/2007 Borlenghi ............... E04F 15/08 428/196
2008/0222986 A1 * 9/2008 Hamel ................ E04F 13/0819 52/415
2009/0038252 A1 * 2/2009 King ................... E04F 13/0876 52/506.05
2009/0053485 A1 * 2/2009 Royals ................... B44D 2/007 118/46
2009/0056257 A1 * 3/2009 Mollinger ............. B44C 5/0461 52/309.4
2009/0218029 A1 * 9/2009 Cohen ....................... B44C 1/28 156/63
2010/0005743 A1 * 1/2010 Anderson ............... B44C 5/043 52/309.13
2010/0088989 A1 * 4/2010 Nasvik ...................... B32B 5/32 52/309.4
2010/0307092 A1 * 12/2010 Bouchard ................. B44C 1/28 52/311.1
2011/0067333 A1 * 3/2011 Lacas .................... E04F 13/141 52/311.1
2011/0293873 A1 * 12/2011 Riccobene ................ E04B 2/12 428/44
2012/0156432 A1 * 6/2012 Gerbl .................... B44C 5/0469 428/151
2012/0247045 A1 * 10/2012 Schlough ............. E04F 13/144 52/477
2014/0034211 A1 * 2/2014 Favretto ................ E04F 13/144 156/63
2014/0041331 A1 * 2/2014 Buoni ................... E04F 13/185 52/506.01
2014/0083033 A1 * 3/2014 McIntosh ............ E04F 13/0885 52/302.1
2014/0237926 A1 * 8/2014 MacDonald ........ E04F 13/0873 52/311.2
2016/0010288 A1 * 1/2016 Castonguay ............ E01C 9/004 404/41
2016/0208498 A1 * 7/2016 Martin ................ E04F 13/0864
2016/0221384 A1 * 8/2016 Grzeskowiak, II ..... B29C 39/12
2018/0126673 A1 * 5/2018 Sanchis Brines ..... B29C 67/244
2018/0155936 A1 * 6/2018 Ning ....................... B44C 3/123
2020/0254727 A1 * 8/2020 Odum ..................... B32B 13/02
2020/0398609 A1 * 12/2020 Briggs .................. E04F 13/185
2022/0363600 A1 * 11/2022 Grzeskowiak, II ..... C04B 41/53

* cited by examiner

METHOD FOR MANUFACTURING A CUTTABLE CLADDING PANEL WITH A MATCHING PATTERN

FIELD OF THE ART

The present invention relates to a manufacturing method for manufacturing a cuttable cladding panel with a matching pattern.

The matching pattern is a visible pattern which, upon joining different parts provided with said pattern, provides continuity from one part to another, giving an impression of wholeness and continuity between the different parts.

In this case, a cladding panel provided with an irregular pattern of elongated lines, veins, and/or strips which can be cut to different sizes is proposed, maintaining the match of the pattern between the resulting parts after cutting.

STATE OF THE ART

Cladding panels provided with a pattern of lines, veins, and/or strips envisaged such that the lines, veins, and/or strips are continuous from one panel to another when they are located next to other similar or identical panels, offering a semblance of continuity, are known.

Documents U.S. Pat. No. 5,011,411, US2007178286, U.S. Pat. No. 1,973,564, EP2177687, and U.S. Pat. No. 1,453,728 show different examples of ceramic cladding panels provided with different patterns of ornamental motifs made up of lines, veins, and/or strips the arrangement of which allows placing different cladding panels in adjacent positions, achieving continuity of said patterns among the panels.

However, if the panels proposed in these documents were to be cut, their capacity to be put together to achieve pattern continuity between adjacent panels would be lost, making the adaptation thereof to surfaces of different sizes impossible.

Furthermore, the patterns shown in these documents are regular patterns made up of pure geometric shapes such as straight lines, circular segments, etc.

Document CN103241049A also describes cladding panels that imitate natural stone containing an irregular pattern of veins. The pattern of the different panels is designed so that, when the panels are placed in a specific order and relative position, the irregular pattern between contiguous panels is continuous, offering the semblance of a continuous pattern.

However, this document also does not allows cutting the cladding panels to adapt same to the different required sizes without the desired effect of continuity in the irregular pattern of lines, veins, and/or strips being lost.

Document WO2016189377 (ENROK SURFACE) discloses a method of manufacturing an artificial stone slab with irregular veins which may have any configuration that is, however, in accordance with a previously fixed pattern, which method comprises preparing a moldable hardenable mass of a first material and engraving the exposed upper face of the mentioned mass with a predefined precise pattern of open grooves coinciding with a pattern of veins, and subsequently filling said grooves using a head that projects a mixture of a second material, said head being moved by an automated arm following said pattern of the open grooves.

This invention arises as a result of the need to develop a solution which allows cutting the cladding panels provided with an irregular pattern of lines, veins, strips or other motifs to different sizes, for the adaptation thereof to different substrates to be clad, while at same time allowing the attainment of the mentioned pattern continuity between adjacent panels resulting from the cut.

BRIEF DESCRIPTION OF THE INVENTION

The present invention relates to a manufacturing method for manufacturing a cuttable cladding panel with a matching pattern.

A matching pattern is a continuous pattern that can be visually distinguished between adjacent elements provided with said matching pattern. In other words, two panels provided with a coordinated matching pattern can be placed one next to the other, with their adjacent borders forming a joint, such that the pattern is continuous from one panel to another coinciding at the point where the pattern of one panel and the pattern of the other panel reach the joint between both panels.

The proposed cladding panel to be manufactured includes a front face and a back face, the front face.

The proposed manufacturing method comprises a design phase comprising:

- defining, on the cladding panel to be produced, an irregular pattern of elongated lines, veins, and/or strips on the front face of the cladding panel, transverse cutting lines determining cutting lines for cutting the cuttable cladding panel to obtain portions of cladding panel of different lengths, and longitudinal cutting lines, symmetrical with respect to a longitudinal axis of symmetry forming pairs of longitudinal cutting lines, orthogonal to the transverse cutting lines, determining cutting lines for cutting the cuttable cladding panel to obtain portions of cladding panel of different widths;
- each longitudinal cutting line cutting through elongated lines, veins, and/or strips of the irregular pattern of elongated lines, veins, and/or strips at longitudinal intersecting points and each transverse cutting line cutting through elongated lines, veins, and/or strips of the irregular pattern of elongated lines, veins, and/or strips at transverse intersecting points;
- each transverse cutting line intersecting with each longitudinal cutting line at a corner point, and all the transverse cutting lines having a corresponding transverse intersecting points in an identical position, the transverse intersecting points of all the transverse cutting lines being in longitudinal alignment, the transverse intersecting points being symmetrical with respect to the longitudinal axis of symmetry;
- the two longitudinal cutting lines of each pair of longitudinal cutting lines having a corresponding longitudinal intersecting points in an identical position, the longitudinal intersecting points of both longitudinal cutting lines being in transverse alignment;
- each transverse intersecting point of each transverse cutting line is at the same distance, from the corner point in which the transverse cutting line goes through, as one longitudinal intersecting point of the longitudinal cutting line going through a same corner point.

The manufacturing method further comprises a manufacturing phase comprising:

- producing the cladding panel defined in the design phase;
- cutting the cladding panel produced along any transverse cutting line and/or along any pair of longitudinal cutting lines, obtaining cladding panel portions;
- locating two of the cladding panel portions adjacent to each other with two of the corner points of the two parts coincident, obtaining a matching and continuous irregular pattern of elongated lines, veins, and/or strips between the adjacent cladding panel portions.

According to the above, the resulting cuttable cladding panel comprises:

- an irregular pattern of elongated lines, veins, and/or strips;
- transverse cutting lines determining cutting lines for cutting the cladding panel to obtain portions of cladding panel of different lengths;
- longitudinal cutting lines, symmetrical with respect to a longitudinal axis of symmetry forming pairs of longitudinal cutting lines, orthogonal to the transverse cutting lines, determining cutting lines for cutting the cladding panel to obtain portions of cladding panel of different widths; wherein
- each longitudinal cutting line cuts through the elongated lines, veins, and/or strips of the irregular pattern at longitudinal intersecting points and each transverse cutting line cuts through the elongated lines, veins, and/or strips of the irregular pattern at transverse intersecting points;
- each transverse cutting line intersects with each longitudinal cutting line at a corner point.

In other words, the present invention proposes creating a cladding panel provided with an irregular pattern, i.e. a pattern that is not defined by geometric motifs, such as lines or circles.

The cladding panel will also include a plurality of longitudinal cutting lines, associated in pairs of longitudinal cutting lines symmetrical with respect to a longitudinal axis of symmetry, and of transverse cutting lines, corresponding to straight lines along which the cladding panel can be cut, modifying its size or dividing it into smaller size sub-panels.

Each longitudinal cutting line intersects with the lines, veins, and/or strips of the pattern at points called longitudinal intersecting points, and similarly each transverse cutting line intersects with the lines, veins, and/or strips of the pattern at points called transverse intersecting points. It will be understood that the lines, veins, and/or strips can have a certain thickness, such that the corresponding longitudinal and/or transverse intersecting point will also have a certain amplitude, without this affecting the effect being sought. Preferably, two transverse or longitudinal intersecting points which are intended to coincide with one another must have the same or very similar width to prevent the presence in the linking pattern of an abrupt change in the width of the lines, veins, and/or strips in adjacent parts.

The transverse and longitudinal cutting lines can be lines which are physically traced or indicated in the cladding panel, but it is also contemplated for said lines to be virtual lines which are not physically indicated on the cladding panel, having a position and distance with respect to the borders or with respect to the longitudinal line of symmetry that is known.

The obtained cuttable cutting panel also includes the following features:

- all the transverse cutting lines have the corresponding transverse intersecting points in an identical position, in longitudinal alignment, said transverse intersecting points being symmetrical with respect to the longitudinal axis of symmetry;
- the two longitudinal cutting lines of each pair of longitudinal cutting lines have the corresponding longitudinal intersecting points in an identical position, in transverse alignment;
- each transverse intersecting point of a transverse cutting line is at the same distance from a corner point which said transverse cutting line goes through as a corresponding longitudinal intersecting point of a longitudinal cutting line going through said corner point;

such that two cladding panel portions obtained by cutting the cladding panel along any transverse cutting line and/or along any pair of longitudinal cutting lines located adjacent to their respective coinciding corner points will have, therebetween, a matching and continuous irregular pattern of elongated lines, veins, and/or strips.

Each longitudinal cutting line and each transverse cutting line intersect at a corner point which will become one corner of the part resulting from cutting the cladding panel along said longitudinal and transverse cutting lines.

Therefore, it is proposed for the pattern of lines, veins, and/or strips and the transverse cutting lines to be configured such that the transverse intersecting points of each transverse cutting line are in an identical position as in the remaining transverse cutting lines, with each transverse intersecting point being aligned, in a direction parallel to the longitudinal axis of symmetry, with a transverse intersecting point of each of the remaining transverse cutting lines. This allows, when the cladding panel is cut along any one of the transverse cutting lines, keeping the position of the transverse intersecting points identical in the parts resulting from said cut, and identical on both opposite sides of the resulting part.

The expression "identical position" shall be understood to admit deviations of less than 2 cm. If the deviations between the transverse and longitudinal intersecting points remain below this maximum deviation of 2 cm, the visual effect resulting from concordance between the adjacent cut pieces is maintained.

It is furthermore proposed for the transverse intersecting points of each transverse cutting line to be symmetrical with respect to the longitudinal axis of symmetry.

Therefore, the parts resulting from cutting the cladding panel along any of the defined transverse cutting lines may be placed one next to the other, with their transverse cutting lines parallel to one another and their corner points coinciding with one another, in any order and even allowing any of the parts to rotate 180°, maintaining continuity in the pattern of lines, veins, and/or strips between the adjacent parts.

As in the previous case, it will be understood that the symmetry of the intersecting points of each cut line admits deviations of less than 2 cm, without damaging the visual effect of concordance.

Likewise, it is proposed for the pattern of lines, veins, and/or strips and the longitudinal cutting lines to be configured such that the longitudinal intersecting points of each longitudinal cutting line are in an identical position as the longitudinal intersecting points of another longitudinal cutting line symmetrical with respect to the longitudinal axis of symmetry, with each transverse intersecting point being aligned, in a direction perpendicular to the longitudinal axis of symmetry, with a longitudinal intersecting point of a symmetrical longitudinal cutting line. This allows, when the cladding panel is cut along two longitudinal cutting lines symmetrical with respect to the longitudinal axis of symmetry, modifying the width of the resulting cladding panel, the position of the longitudinal intersecting points remains identical on the two opposite sides, corresponding to the symmetrical longitudinal cutting lines, and remains identical in all the parts having an identical width obtained from cutting the cladding panel.

This allows the parts resulting from cutting the cladding panel along any pair of symmetrical longitudinal cutting lines to be placed one next to the other, with their longitudinal cutting lines parallel to one another and their corner points coinciding with one another, in any order, maintaining continuity in the pattern of lines, veins, and/or strips between the adjacent parts.

The pattern of lines, veins, and/or strips, the longitudinal cutting lines, and the transverse cutting lines are configured such that the distance of each transverse intersecting point of a transverse cutting line with respect to a corner point defined on said transverse cutting line is identical to the distance, with respect to that same corner point, of a longitudinal intersecting point defined on the longitudinal cutting line passing through said corner point.

Regardless of the longitudinal cutting line along which cutting is performed, this feature allows arranging the resulting parts adjacent to one another with their corner points coinciding with one another and with the sides obtained from cutting along the longitudinal cutting line joined to the sides obtained from cutting along the transverse cutting line, maintaining continuity in the pattern of lines, veins, and/or strips between the adjacent parts.

Therefore, as a result of the foregoing a cladding panel which can be cut to any width defined by a pair of longitudinal cutting lines and to any length defined by the transverse cutting lines is obtained, allowing the parts obtained from said cutting to be freely combined by placing their corner points such that they coincide with one another, maintaining the continuity of the lines, veins, and/or strips forming the pattern between the different adjacent parts, and achieving an effect of visual continuity.

This allows a cladding panel to be cut for adaptation thereof to a substrate to be clad or to a specific location, and it allows the remaining parts of the cladding panel to likewise be utilized, successfully maintaining the mentioned continuity, thereby obtaining a better visual result and increasing the utilization of the parts of the cladding panel, reducing leftover.

An irregular or random arrangement of the transverse and longitudinal intersecting points would not allow the pattern of the parts resulting from cutting to be continuous with other adjacent parts when the cladding panel is cut along the longitudinal or transverse cutting lines.

The cladding panel is preferably rectangular, having two longitudinal edges parallel to the longitudinal axis of symmetry and two transverse edges perpendicular to the longitudinal axis of symmetry.

Preferably, the two longitudinal edges can be considered equivalent to longitudinal cutting lines as they will have the same features as the longitudinal cutting lines, i.e., including longitudinal intersecting points in the same positions as those described in relation to the longitudinal cutting lines, and the two transverse edges can be considered equivalent to transverse cutting lines as they have the same features as the transverse cutting lines, for the same reason.

It is also contemplated for a cladding panel to include more than one longitudinal axis of symmetry that are adjacent and parallel to one another, each with their respective pairs of longitudinal cutting lines, therefore allowing the attainment of one or more portions of the cladding panel for each existing longitudinal axis of symmetry.

According to one embodiment, the transverse cutting lines form pairs of transverse cutting lines symmetrical with respect to a transverse axis of symmetry, the transverse axis of symmetry being perpendicular to the longitudinal axis of symmetry.

It is also proposed for there to be a plurality of intermediate longitudinal cutting lines adjacent to one another and separated by a distance between two longitudinal cutting lines located on one and the same side of the longitudinal axis of symmetry. Said plurality of adjacent longitudinal cutting lines forms a cutting band.

The longitudinal intersecting points of the longitudinal cutting lines of said cutting band are connected to one another by means of lines, veins, and/or strips of the irregular pattern that are inclined 45° with respect to said longitudinal cutting lines, i.e., within the cutting band, the lines, veins, and/or strips of the pattern will be inclined 45°.

The mentioned distance separating the longitudinal cutting lines of a cutting band will preferably be equal to or less than 10 mm, or equal to or less than 4 mm.

Therefore, the cutting band may virtually contain infinite parallel longitudinal cutting lines, all of them complying with the described requirements as a result of the 45° inclination of the lines, veins, and/or strips of the pattern within said cutting band. In other words, the cladding panel can be cut along any straight line parallel to the axis of symmetry contained within the cutting band, maintaining pattern continuity between the resulting parts.

To maintain the irregularity of the pattern, it is suitable for the cutting band to only occupy a portion of the total surface of the cladding panel, for example occupying less than 10% of its surface.

Preferably, the irregular pattern will simulate veins of natural stone.

This may be achieved, for example, by means of an artificial stone slab, i.e., a slab made of mortar or resins and aggregate granules.

In such case, the irregular pattern is preferably formed by elongated lines, veins, and/or strips embedded in said cladding panel, made of a material visually distinguishable from the material forming the rest of the cladding panel. This solution allows the lines, veins, and/or strips to be visible both on the front face and on the back face of the cladding panel, even allowing leaving both faces of the cladding panel exposed, for example, acting as a vertical partition, or allowing the interchangeable placement of the parts resulting from cutting the cladding panel exposing its front face or back face.

Alternatively, it is proposed for the irregular pattern to be printed, screen-printed, and/or engraved on a visible surface of the cladding panel, which may be a ceramic panel or a laminated panel, for example.

Preferably, the transverse and longitudinal cutting lines cutting lines will be marked:

- on the back face of the cladding panel; or
- on the front face by means of a soluble ink; or
- on a removable protective film adhered to the cladding panel.

Any of these solutions allows correctly visualizing the cutting lines, while at the same time they allow preventing said cutting lines from remaining visible after installation.

The transverse cutting lines may also be defined forming pairs of transverse cutting lines symmetrical with respect to a transverse axis of symmetry perpendicular to the longitudinal axis of symmetry.

According to a proposed additional embodiment, the method comprises producing a cladding panel in the manufacturing step and printing, engraving, or screen-printing the irregular pattern on a visible surface of said cladding panel.

Additionally, it is proposed for the manufacturing step to comprise producing an artificial stone slab including the irregular pattern of elongated lines, veins, and/or strips embedded in said artificial stone slab, the irregular pattern being made of a material visually distinguishable from the material forming the rest of the artificial stone slab.

The proposed method for the manufacture of the artificial stone slab is proposed to include, according to a preferred embodiment, at least the following production steps:

- pouring of the material which constitutes the artificial stone slab with no irregular pattern into a cast;
- at least one compaction step of the material which constitutes the artificial stone slab without an irregular pattern;
- integration of the material forming the irregular pattern into the previously compacted material;
- at least one compaction step of all the material which constitutes the artificial stone slab;
- a curing step.

Said compaction step may be carried out, for example, by pressure applied with rollers or with a flat press and may be combined with vibration or optionally vacuum. Compaction obtained only by vibration and/or vacuum is also covered.

Curing may include the baking of the artificial stone slab.

According to a third aspect, the present invention furthermore relates to the use of the cuttable cladding panel with a matching pattern described above as kitchen worktops with an irregular pattern of matching and continuous elongated lines, veins, and/or strips throughout the entire kitchen worktop, the kitchen worktop being formed by several parts of the same width obtained from cutting the cladding panel along any pair of longitudinal cutting lines, and along any transverse cutting line, subsequently assembled with their corresponding corner points coinciding with one another.

In other words, the present invention proposes using the proposed cladding panel for cladding kitchen worktops by cutting the cladding panel along the desired longitudinal and/or transverse cutting lines and joining the resulting parts, achieving continuity in the pattern of lines, veins, and/or strips between the adjacent parts.

This allows, for example, cutting the cladding panel to different widths for adapting same to different kitchen widths or for allowing the worktop to project to a greater or lesser extent with respect to the furniture arranged in the lower part of the kitchen, while at the same time it allows joining different parts, for example, to form an L- or U-shaped worktop, always maintaining continuity between the adjacent parts.

Likewise, a worktop can be joined to a side front, maintaining the continuity of the pattern, or the pattern of the worktop can even be linked with the pattern of the splashback or a plinth.

Although this is the preferred use of the invention, the invention can also be for other uses, such as for cladding walls or floors, for example.

It shall be understood that this invention also covers deviations of less than 2 cm from the theoretical position described for the longitudinal and transverse intersecting points without affecting the visual effect sought.

Other features of the invention will become apparent in the following detailed description of an embodiment.

BRIEF DESCRIPTION OF THE DRAWINGS

The foregoing and other advantages and features will be clearly understood based the following detailed description of an embodiment in reference to the attached drawings which must be interpreted in an illustrative and non-limiting manner, in which.

DETAILED DESCRIPTION OF AN EMBODIMENT

The attached drawings show illustrative non-limiting embodiments of the present invention.

Figure 1:
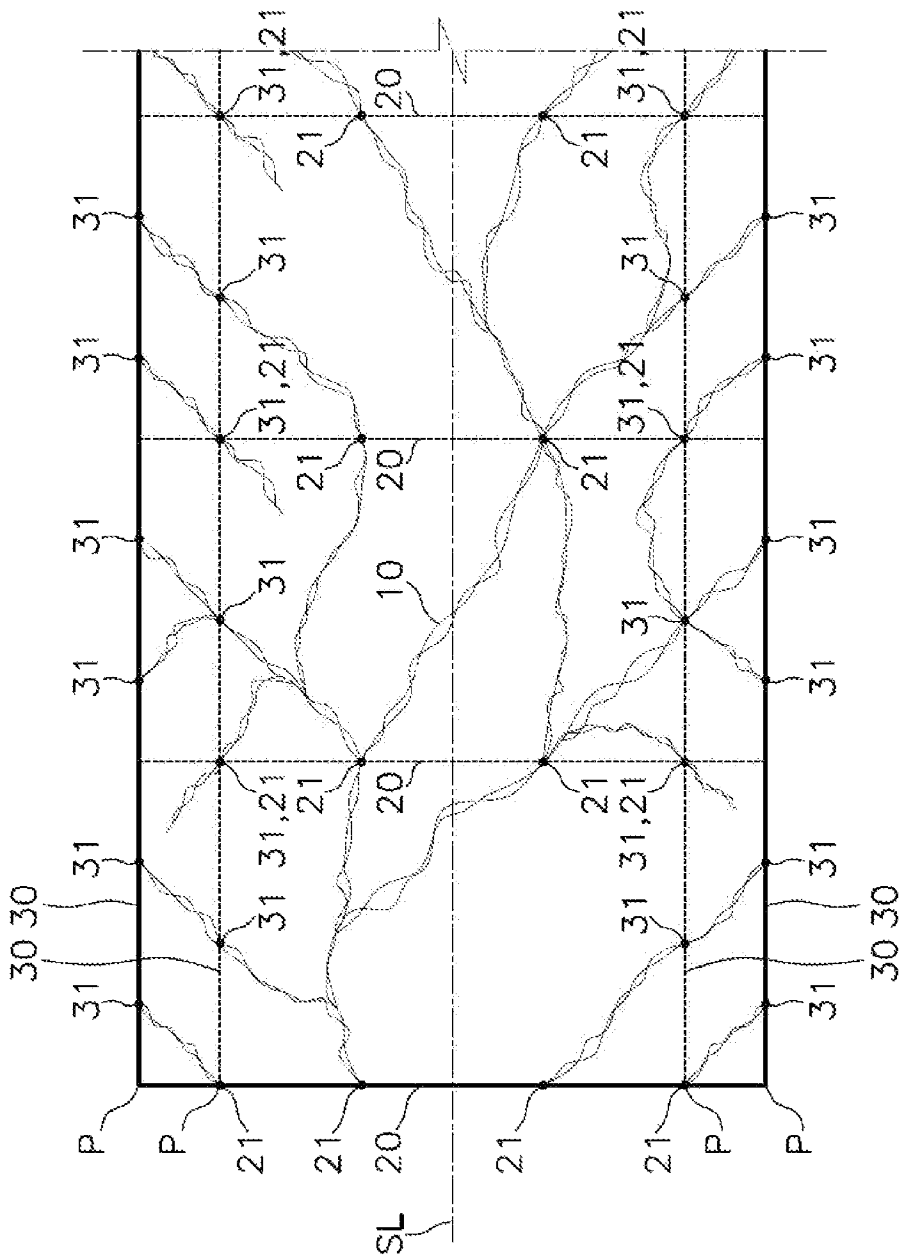
FIG. 1 shows an enlarged view of a portion of cladding panel including multiple transverse and longitudinal cutting lines, with all the different elements thereof indicated with reference numbers.
Figure 2:
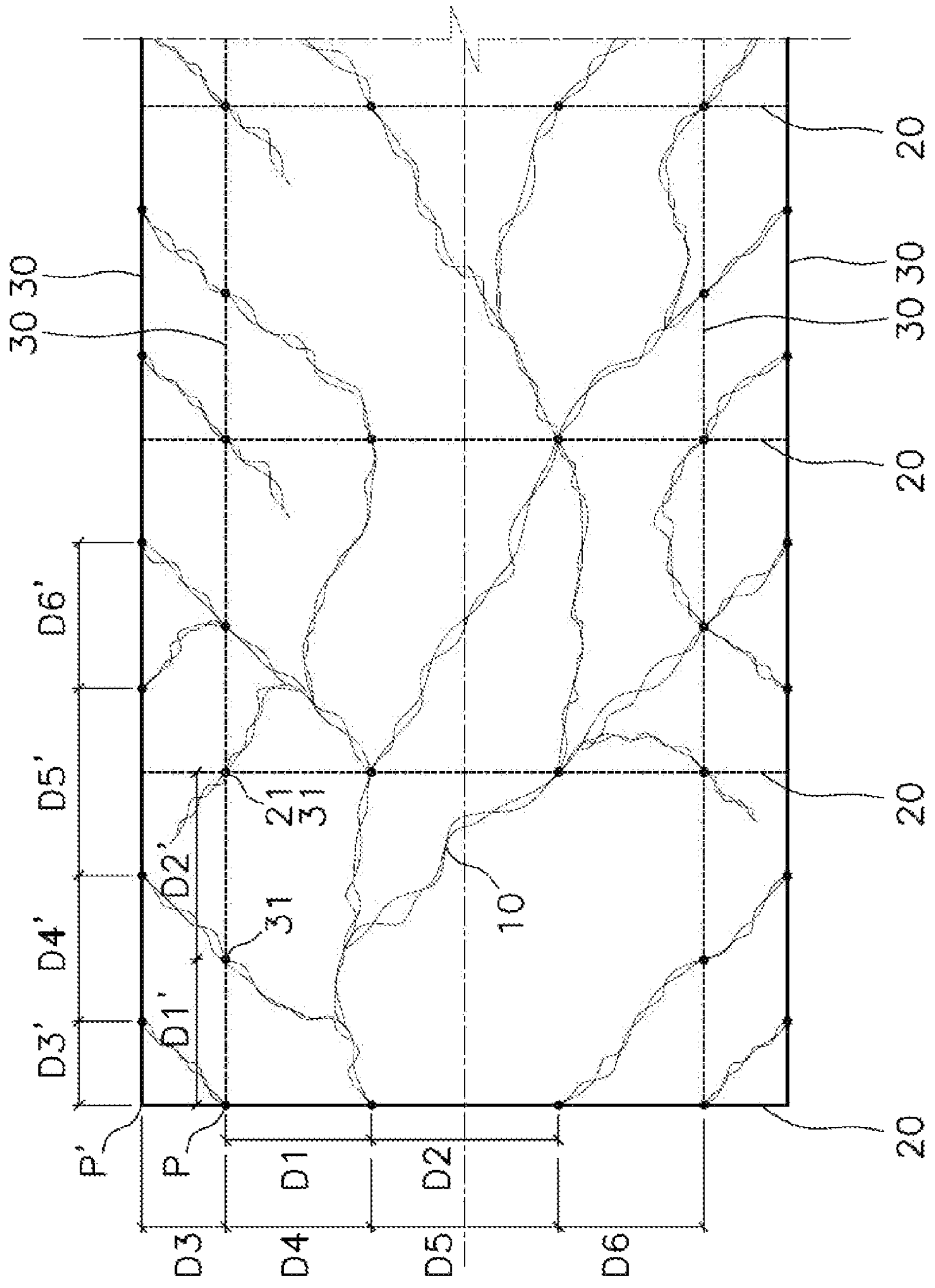
FIG. 2 shows the same view as FIG. 1 but indicating the distances in height between two corner points and the respective transverse and longitudinal intersecting points.

FIGS. 1 and 2 show an enlarged view of a portion of a cladding panel 1 like the one proposed, where two longitudinal edges of the cladding panel 1 and a transverse edge determining a rectangular cladding panel 1 can be seen.

The shown portion of the cladding panel 1 further comprises a longitudinal axis of symmetry SL in its center, parallel to and equidistant from the two longitudinal edges, in addition to two symmetrical longitudinal cutting lines 30, shown by a discontinuous line, arranged on either side of the longitudinal axis of symmetry SL.

The cladding panel 1 also includes three transverse cutting lines 20 equidistant from one another and perpendicular with respect to the longitudinal axis of symmetry SL.

Said longitudinal and transverse cutting lines 30 and 20 can be, for example, printed with washable ink on the surface of the cladding panel 1 to allow their elimination after installing the cladding panel 1, or alternatively marked, for example, on the borders of the panel or indicated in a measurement table.

In this example, the cladding panel 1 furthermore has an irregular pattern 10 in the form of zigzagging veins going through its surface, imitating the natural veins of a marble panel in this example.

The veins forming the pattern 10 intersect with the longitudinal cutting lines 30 only at longitudinal intersecting points 31, and they intersect with the transverse cutting lines 20 only at transverse intersecting points 21.

Furthermore, the longitudinal cutting lines 30 intersect with the transverse cutting lines 20 at corner points P given that, if the cladding panel is cut following two longitudinal and transverse cutting lines 30 and 20, the corner point P will become one of the corners of the resulting cladding panel portion.

In this example, some transverse and longitudinal intersecting points 21 and 31 and some corner points P coincide with one another.

The transverse intersecting points 21 of each transverse cutting line 20 are symmetrical with respect to the longitudinal axis of symmetry SL and arranged in an identical position with respect to the longitudinal axis of symmetry SL in all the transverse cutting lines 20. In other words, the transverse intersecting points 21 of a transverse cutting line 20 are aligned, in a direction parallel to the longitudinal axis of symmetry SL, with the transverse intersecting points 21 of the remaining transverse cutting lines 20.

This allows cutting the cladding panel 1 along any transverse cutting line 20, obtaining a transverse edge with identical transverse intersecting points 21 at all times.

In an equivalent manner, it is proposed for the longitudinal intersecting points 31 of two longitudinal cutting lines 30, that are symmetrical with respect to the longitudinal axis of symmetry SL and constitute a pair of longitudinal cutting lines 30, to also be located in an identical position in both longitudinal cutting lines 30, the longitudinal intersecting points 31 of one longitudinal cutting line 30 being aligned with a symmetrical longitudinal intersecting point 31 located in the other longitudinal cutting line 30.

Furthermore, it is proposed for each transverse intersecting point 21 on a cutting line 20 to be located at a distance, with respect to a corner point P, that is equal to the complementary longitudinal intersecting points 31 located in a longitudinal cutting line passing through said corner point P.

This feature is shown in FIG. 2 which indicates how two transverse intersecting points 21 are located at a distance D1 and D2 with respect to a corner point P, those distances being equal to distances D1' and D2' of two longitudinal intersecting points 31 with respect to that same corner point P of a longitudinal cutting line 30 passing through said corner point P.

Likewise, FIG. 2 also shows how four transverse intersecting points 21 are located at a distance D3, D4, D5, and D6 with respect to a corner point P', those distances being equal to distances D3', D4', D5', and D6' of two longitudinal intersecting points 31 with respect to that same corner point P' of a longitudinal cutting line 30 passing through said corner point P'.

When these features are met, by cutting the cladding panel 1 along any of the transverse cutting lines 20 and along any pair of symmetrical longitudinal cutting lines 30, the resulting part will be able to fit with other parts, achieving continuity in the pattern 10.

Figure 3:
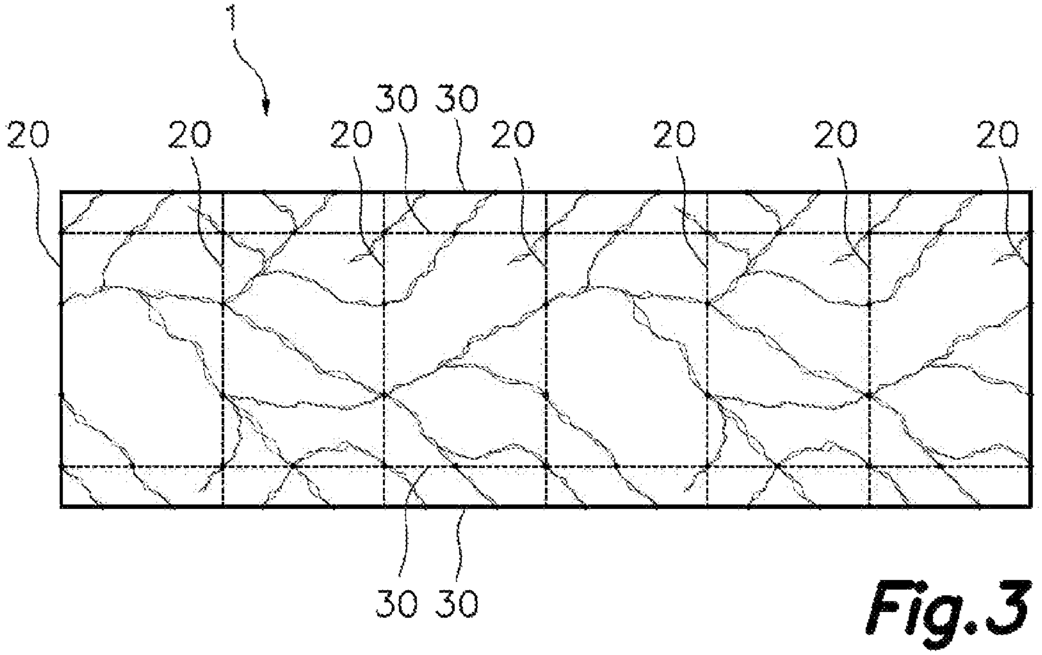
FIG. 3 shows a view of a cladding panel before cutting.

FIG. 3 shows an example of a complete cladding panel 1 before cutting only with an indication of the longitudinal cutting lines 20 and transverse cutting lines 20.

Figure 4:
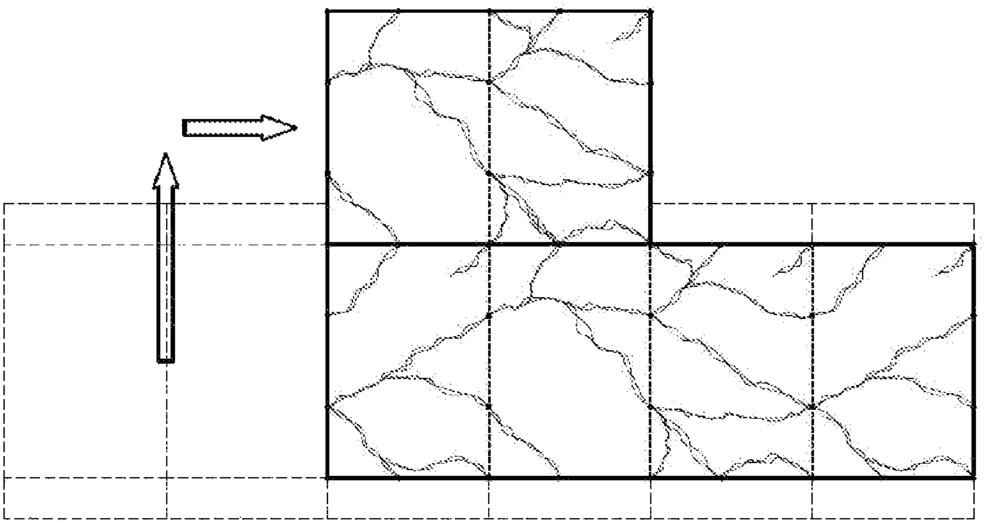
FIG. 4 shows the same cladding panel shown in FIG. 3 but after reducing the width thereof by cutting along two symmetrical longitudinal cutting lines, after dividing the cladding panel by cutting it along a transverse cutting line, and showing a first position in which the left portion of the cladding panel has been located on one side of the right portion by means of a translational movement indicated by means of arrows in the drawing, achieving pattern continuity between the left and right portions.

FIG. 4 shows the same cladding panel 1 after having reduced its width by cutting it along a pair of symmetrical longitudinal cutting lines 30, the cladding panel 1 also having been divided further into two portions. The resulting left portion has been moved following the direction indicated by the arrows and placed adjacent to the right portion of the cladding panel 1, causing one of their respective corner points P to coincide. The result is an L-shaped cladding panel 1 the pattern 10 of which presents the matching and continuity of veins between the attached portions.

Figure 5:
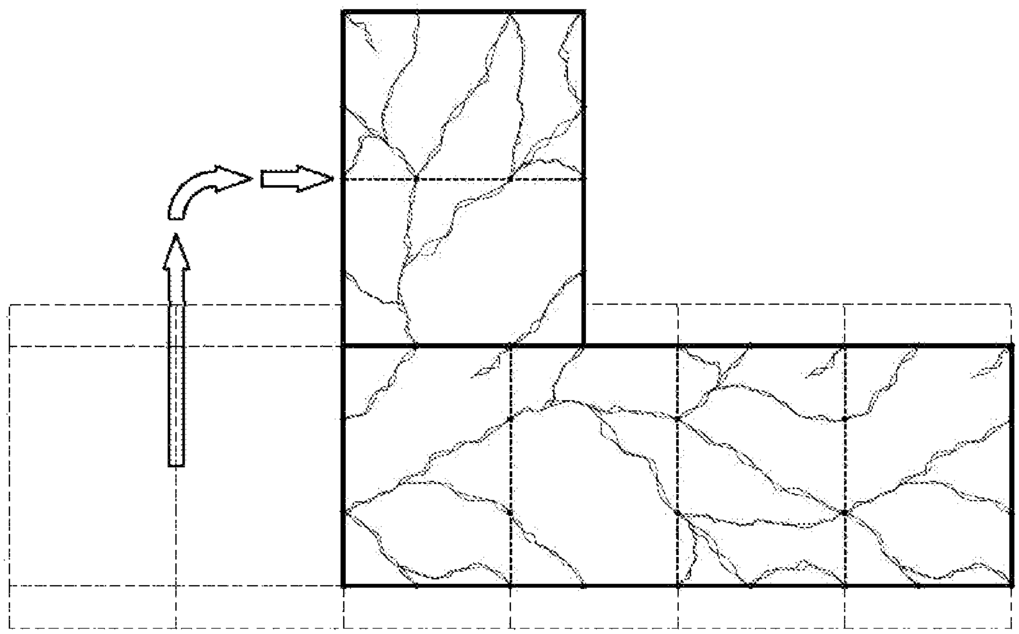
FIG. 5 shows the same cut cladding panel as FIG. 4 but showing a second position in which the left portion of the cladding panel has been located on one side of the right portion by means of a translational movement and a 90° rotation in a direction indicated by means of arrows in the drawing, achieving pattern continuity between the left and right portions.

FIG. 5 shows how those same left and right portions can also be connected achieving continuity in the pattern 10 when the left portion is not only translated but also rotated 90° in one direction.

Figure 6:
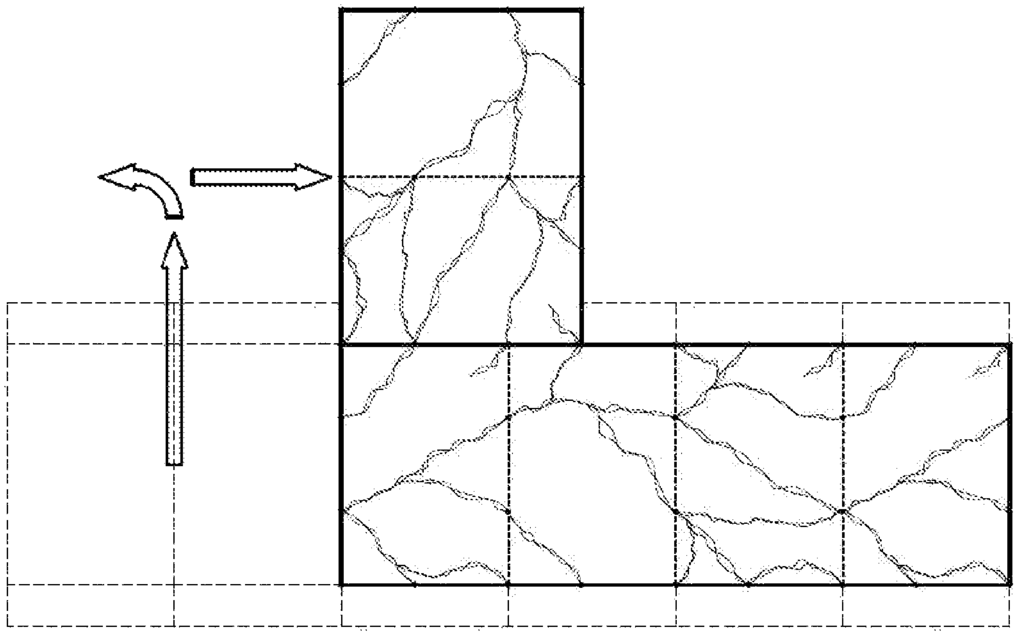
FIG. 6 shows the same cut cladding panel as FIG. 4 but showing a third position in which the left portion of the cladding panel has been located on one side of the right portion by means of a translational movement and a 90° rotation in another inverse direction indicated by means of arrows in the drawing, achieving pattern continuity between the left and right portions.

Likewise, FIG. 6 shows how the pattern 10 also coincides when the left portion is rotated 90° in another inverse direction.

Therefore, FIGS. 4, 5, and 6 demonstrate the great versatility of the system which allows very freely combining the portions resulting from cutting the cladding panel 1, achieving continuity in the pattern 10, in this example veins, between the adjacent portions at all times.

Naturally, if multiple cladding panels 1 the longitudinal and transverse cutting lines 30 and 20 of which have the longitudinal and transverse intersecting points 31, 21 in an identical position are produced, this effect may also be achieved by combining cut portions of different cladding panels 1.

Figure 7:
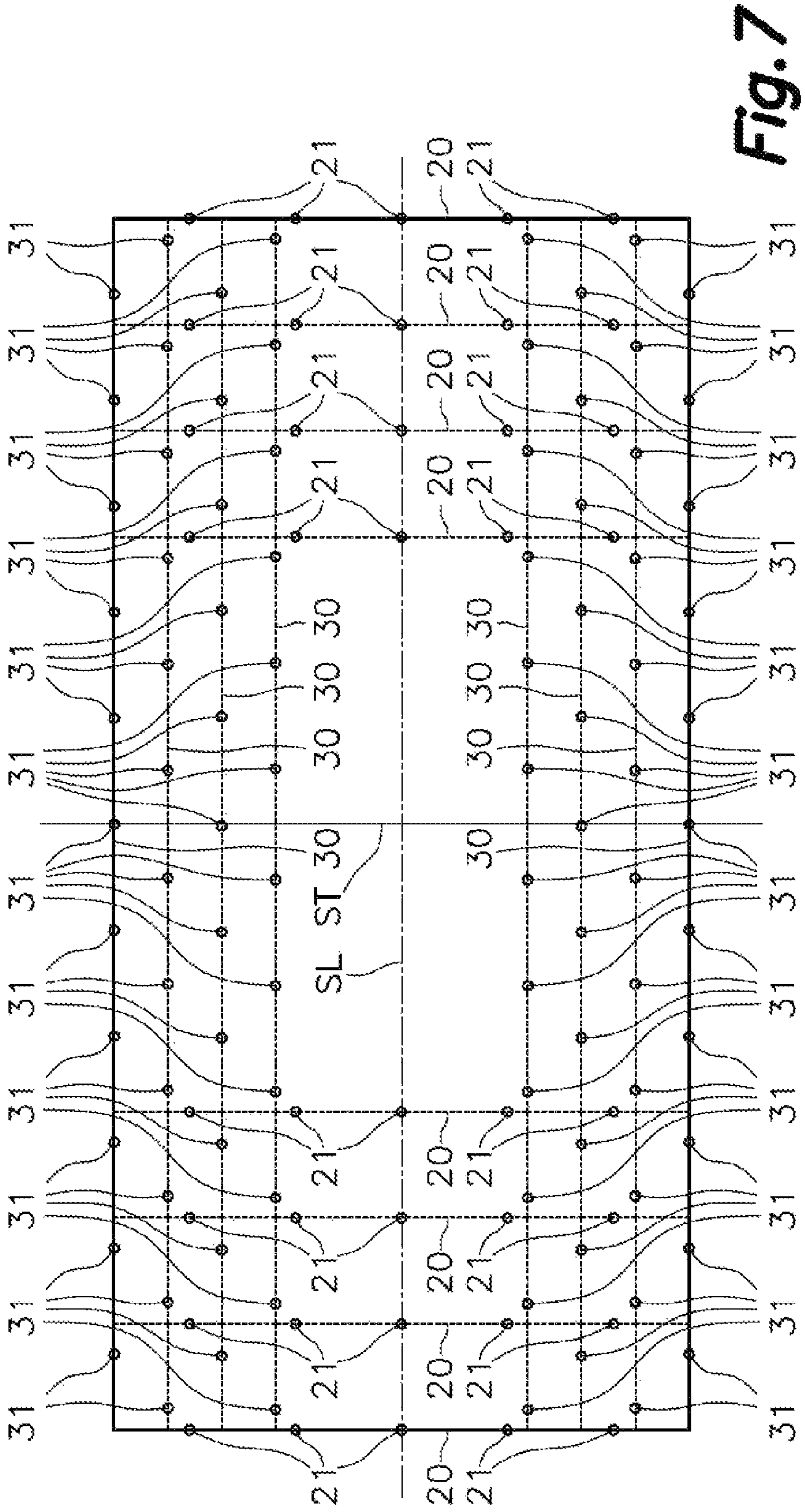
FIG. 7 shows a first phase of the design step for designing the cladding panel in which the longitudinal and transverse cutting lines and the longitudinal and transverse intersecting points are defined.

FIG. 7 shows a design step of the proposed method which consists of defining on a cladding panel 1 the position of the longitudinal cutting lines 30 and transverse cutting lines 20 and their corresponding longitudinal intersecting points 31 and transverse intersecting points 21, according to the rules described above.

In this example, the cladding panel 1 is a cladding panel 1 which, in addition to the longitudinal axis of symmetry SL, includes a transverse axis of symmetry ST perpendicular to the longitudinal axis of symmetry SL.

The transverse cutting lines 20 are symmetrical on both sides of the transverse axis of symmetry ST.

Once the longitudinal intersecting points 31 and transverse intersecting points 21 are defined, the next design step consists of defining an irregular pattern 10 of lines, veins, and/or strips which must intersect with the longitudinal intersecting lines 30 and transverse intersecting lines 20 only at the longitudinal intersecting points 31 and transverse intersecting points 21.

This step can be performed, for example, by applying the teachings of document WO2016189377 mentioned above.

Figure 8:
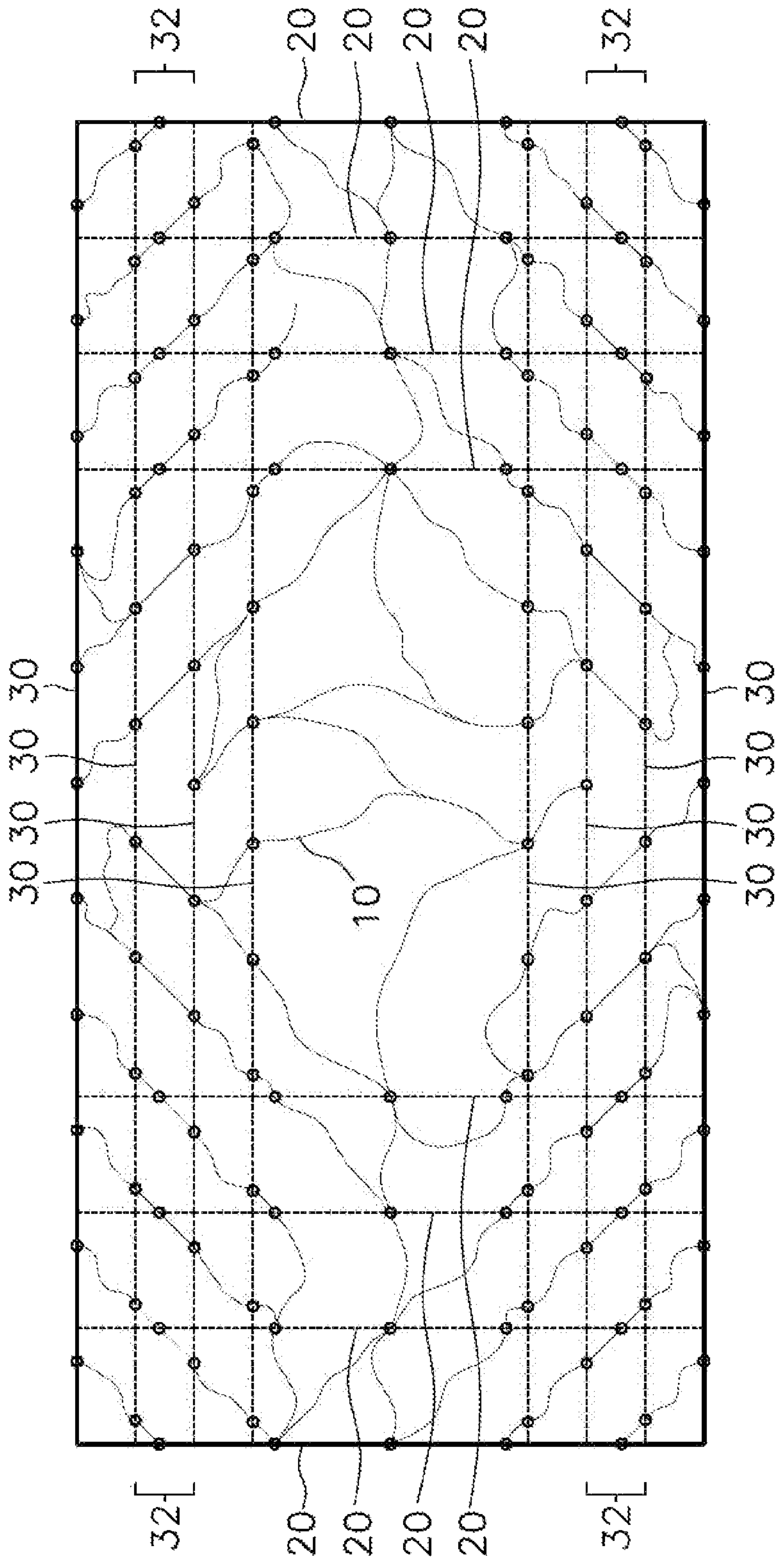
FIG. 8 shows a second phase of the design step for designing the cladding panel in which the pattern of lines, veins, and/or strips is defined on the cladding panel, passing through the previously defined transverse and longitudinal intersecting points.

In this example (see FIG. 8), a cutting band 32 has furthermore been defined on each side of the longitudinal axis of symmetry SL between two longitudinal cutting lines 30, assuring that all the lines, veins, and/or strips of the pattern 10 contained in said cutting band 32 are straight and defined at a 45° angle with respect to the two longitudinal cutting lines 30 limiting the cutting band 32, each connecting two longitudinal intersecting points 31 of the two longitudinal cutting lines 30 demarcating the cutting band 32.

As a result of this feature, any line contained in said cutting band 32 and parallel to the longitudinal cutting lines 30 will intersect with the pattern 10 at longitudinal intersecting points 31 complying with the requirements described above, converting said line into a longitudinal cutting line 30. Therefore, it can be considered that the cutting band 32 contains infinite longitudinal cutting lines 30, which allows cutting the cladding panel 1 to any desired width, within the range defined between the two cutting bands 32 symmetrical with respect to the longitudinal axis of symmetry SL.

Figure 9:
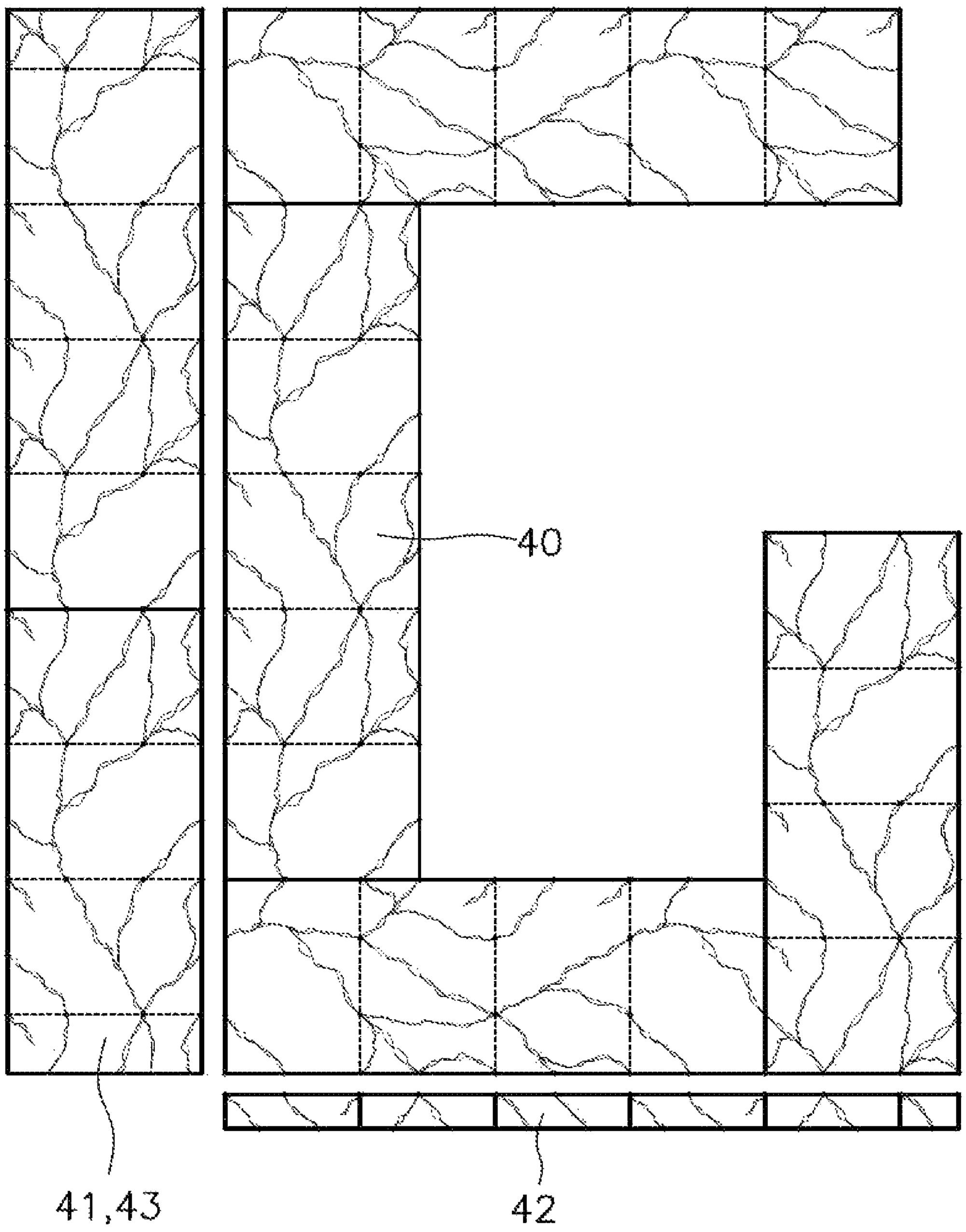
FIG. 9 shows the use of the proposed cladding panel as a G-shaped kitchen worktop formed by four attached parts maintaining pattern continuity, said four parts being obtained by cutting the proposed cladding panel or several cladding panels that are identical or have identical features and dimensions. This drawing also shows a splashback in a horizontal position on the left-hand side of the drawing and formed by two attached parts, maintaining pattern continuity with one another and with the worktop, and a plinth in a horizontal position on the lower side of the drawing, formed from the leftover after cutting the cladding panel forming the worktop, and maintains pattern continuity with said worktop.
Figure 10:
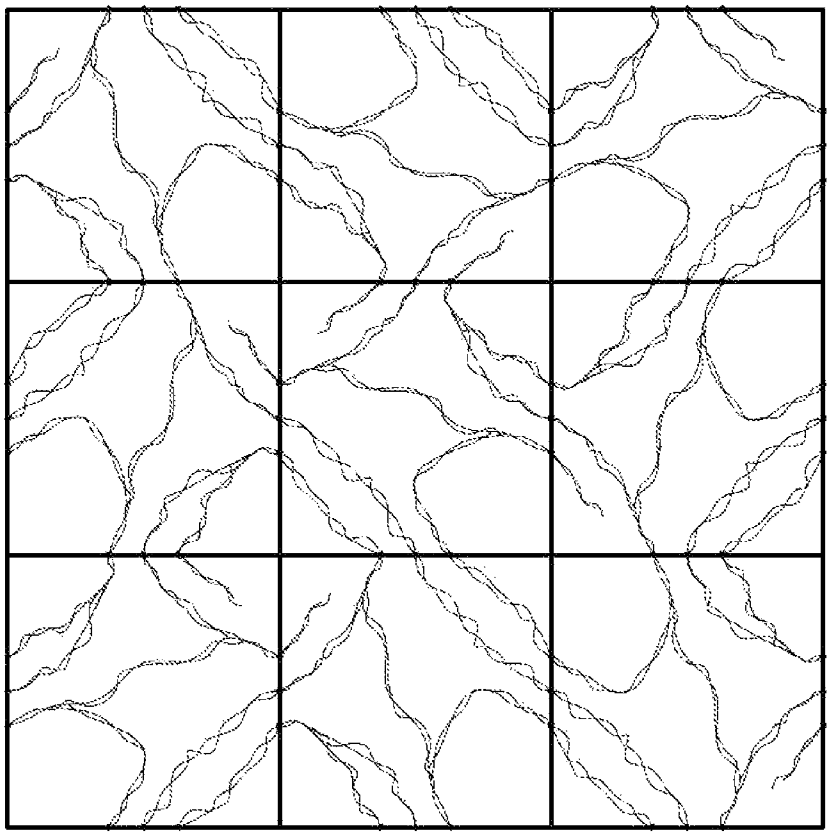
FIG. 10 shows a set of nine square cladding parts obtained from cutting the cladding panel, with all of them having an identical pattern and being attached to one another in different orientations forming a continuous cladding for floors or walls.

FIG. 9 shows an example of the use that can be made of the proposed cladding panel 1. In this case, the portions obtained from cutting the cladding panel 1 have been used for cladding a kitchen worktop 40.

In this example, a G-shaped kitchen comprising four portions of connected cladding panel 1 has been proposed, successfully maintaining continuity in the pattern 10, in this example veins, between the four adjacent portions.

The manner in which it would be possible to clad a vertical wall of the kitchen above the worktop 40, corresponding to the splashback 41 of the kitchen or to a plinth 42, or below the worktop 40, corresponding to the front 43 of the worktop, is furthermore shown, achieving continuity in the pattern 10 also between the portions of cladding panel 1 of the worktop 40 and the vertical wall.

In FIG. 9, the portions of the cladding panel 1 intended for forming the splashback 41 or the front 43 of the worktop 40 have been drawn in a landscape orientation to show that the pattern 10 is continuous with the worktop 40.

This embodiment shows, by way of example, the splashback 41 on the left side of the drawing and also a plinth 42 on the lower side of the drawing.

Plinths 42 can be obtained from small portions obtained from cutting the cladding panel 1, thereby better utilizing the cladding panel 1 and reducing leftover.

It is contemplated that a cladding panel 1 may contain two parallel longitudinal axes of symmetry SL, each with its respective symmetrical longitudinal cutting lines 30 and transverse cutting lines 20, which allow longitudinally dividing the cladding panel 1 into two halves, each of them containing a longitudinal axis of symmetry SL which allows obtaining other portions with a matching pattern of each of the two halves.

It will be understood that the different parts making up the invention described in an embodiment can be freely combined with parts described in other different embodiments even though said combination has not been explicitly described, provided that the combination does not entail any drawback.

The invention claimed is:

1. A method for manufacturing a cuttable cladding panel with a matching pattern, the cuttable cladding panel to be produced having a front face and a back face, the method comprises:

a design phase comprising:

defining, on the cuttable cladding panel to be produced, an irregular pattern of elongated lines, veins, and/or strips on the front face of the cuttable cladding panel, transverse cutting lines determining cutting lines for cutting the cuttable cladding panel to obtain portions of cladding panel of different lengths, and longitudinal cutting lines, symmetrical with respect to a longitudinal axis of symmetry forming pairs of longitudinal cutting lines, orthogonal to the transverse cutting lines, determining cutting lines for cutting the cuttable cladding panel to obtain portions of cladding panel of different widths;

each longitudinal cutting line cutting through elongated lines, veins, and/or strips of the irregular pattern of elongated lines, veins, and/or strips at longitudinal intersecting points and each transverse cutting line cutting through elongated lines, veins, and/or strips of the irregular pattern of elongated lines, veins, and/or strips at transverse intersecting points;

each transverse cutting line intersecting with each longitudinal cutting line at a corner point, and all the transverse cutting lines having a corresponding transverse intersecting points in an identical position, the transverse intersecting points of all the transverse cutting lines being in longitudinal alignment, the transverse intersecting points being symmetrical with respect to the longitudinal axis of symmetry;

each longitudinal cutting line of each pair of longitudinal cutting lines having a corresponding longitudinal intersecting points in an identical position, the longitudinal intersecting points of both longitudinal cutting lines being in transverse alignment;

each transverse intersecting point of each transverse cutting line is at a same distance, from the corner point in which the transverse cutting line goes through, as one longitudinal intersecting point of the longitudinal cutting line going through a same corner point;

a manufacturing phase comprising:

producing the cuttable cladding panel defined in the design phase;

cutting the cuttable cladding panel produced along any transverse cutting line and/or along any pair of longitudinal cutting lines, obtaining cladding panel portions;

locating two of the cuttable cladding panel portions adjacent to each other with two of the corner points of two parts coincident, obtaining a matching and continuous irregular pattern of elongated lines, veins, and/or strips between the adjacent cladding panel portions.

2. The manufacturing method according to claim 1, wherein during the design phase, the irregular pattern of elongated lines, veins, and/or strips are designed to include, between two longitudinal cutting lines located on a same side of the longitudinal axis of symmetry, elongated lines, veins, and/or strips that are inclined 45° with respect to the longitudinal cutting lines, defining a cutting band containing a plurality of adjacent longitudinal cutting lines separated by a distance.

3. The manufacturing method according to claim 2, wherein the distance separating the longitudinal cutting lines of a cutting band is equal to or less than 10 mm, or equal to or less than 4 mm.

4. The manufacturing method according to claim 1, wherein the irregular pattern of elongated lines, veins, and/or strips simulates veins of natural stone.

5. The manufacturing method according to claim 1, wherein the cuttable cladding panel is a ceramic panel or a laminated panel.

6. The manufacturing method according to claim 1, wherein the manufacturing phase further comprises marking the transverse cutting lines and the longitudinal cutting lines in the cuttable cladding panel.

7. The manufacturing method according to claim 1, wherein the manufacturing phase comprises printing, engraving, or screen-printing the irregular pattern on the front face of the cuttable cladding panel.

8. The manufacturing method according to claim 1, wherein the manufacturing phase comprises producing an artificial stone slab comprising the irregular pattern of elongated lines, veins, and/or strips embedded in the artificial stone slab, the irregular pattern being made of a material visually distinguishable from a material forming the rest of the artificial stone slab.

9. The manufacturing method according to claim 8, wherein manufacture of the artificial stone slab comprises at least the following:

pouring of material constituting the artificial stone slab with no irregular pattern into a cast;

at least one compaction phase of material constitutive of the artificial stone slab without an irregular pattern;

integration of material forming the irregular pattern into the previously compacted material;

at least one compaction phase of all material constitutive of the artificial stone slab;

a curing phase.

10. The manufacturing method according to claim 9 wherein the cladding panel portions obtained after the manufacturing phase are installed as a kitchen worktops or as a kitchen worktops and splash back or side front thereof, the cladding panel portions being adjacent to each other obtaining a matching and continuous irregular pattern of elongated lines, veins, and/or strips between adjacent cladding panel portions.

11. The manufacturing method according to claim 6 wherein the transverse cutting lines and the longitudinal cutting lines are marked:

on the back face of the cuttable cladding panel; or on the front face by means of a soluble ink; or on a removable protective film adhered to the cuttable cladding panel.

* * * * *